United States Patent
Sawada et al.

[19]

[11] Patent Number: 6,137,769
[45] Date of Patent: Oct. 24, 2000

[54] OPTICAL RECORDING MEDIUM AND METHOD OF INFORMATION RECORDING/READING AN OPTICAL RECORDING MEDIUM

[75] Inventors: Yasuo Sawada, Tokyo; Toru Yashiro, Kanagawa; Eiji Noda, Shizuoka, all of Japan

[73] Assignee: Ricoh Company, Ltd., Tokyo, Japan

[21] Appl. No.: 09/240,679

[22] Filed: Feb. 2, 1999

[30] Foreign Application Priority Data

| Feb. 2, 1998 | [JP] | Japan | 10-020967 |
| Dec. 17, 1998 | [JP] | Japan | 10-359133 |

[51] Int. Cl.⁷ .................................................. G11B 7/24
[52] U.S. Cl. ..................... 369/275.3; 369/275.2
[58] Field of Search ............................ 369/275.3, 275.2, 369/32, 58, 47, 48

[56] References Cited

U.S. PATENT DOCUMENTS

| 5,337,357 | 8/1994 | Chou et al. | 380/4 |
| 5,499,225 | 3/1996 | Yoshimura | 369/58 |
| 5,721,856 | 2/1998 | Takeuchi | 369/32 |
| 5,825,726 | 10/1998 | Hwang et al. | 369/32 |
| 6,021,103 | 2/2000 | Tani | 369/58 |

FOREIGN PATENT DOCUMENTS

| 0 552 986 A2 | 1/1993 | European Pat. Off. . |
| 0 595 358 A2 | 10/1993 | European Pat. Off. . |
| 0 704 844 A1 | 9/1995 | European Pat. Off. . |
| 0 712 130 A1 | 11/1995 | European Pat. Off. . |

*Primary Examiner*—Tan Dinh
*Attorney, Agent, or Firm*—Dickstein Shapiro Morin & Oshinsky, LLP

[57] ABSTRACT

An optical recording medium which includes a PMA area, a TOC area, program area, an area that includes a user area and lead-out area. A portion of the PMA area, which relates to the program area, is in a recorded state and the TOC area is in an unrecorded state. Alternatively, the PMA may be in an unrecorded state. In addition, a password may be recorded in a portion of an information area. A method of erasing the medium and a system for reading and recording information are also provided.

3 Claims, 3 Drawing Sheets

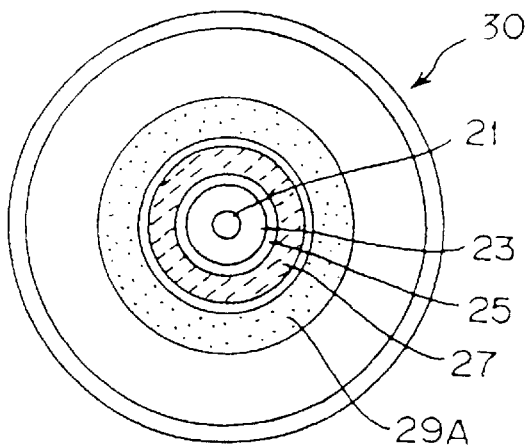
FIG. 3
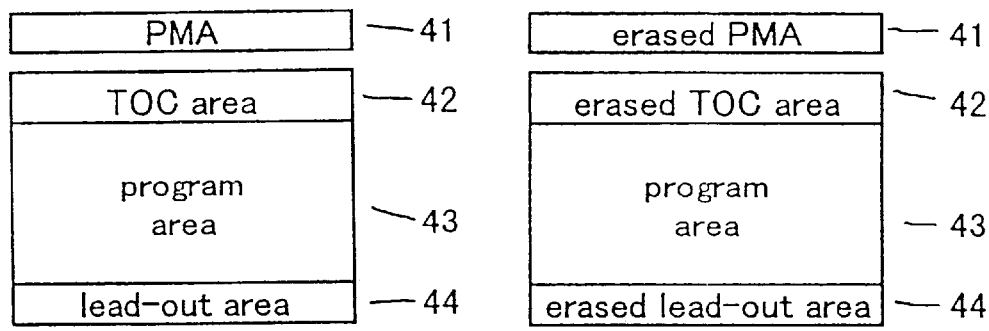
FIG. 4A
(PRIOR ART)
FIG. 4B
(PRIOR ART)
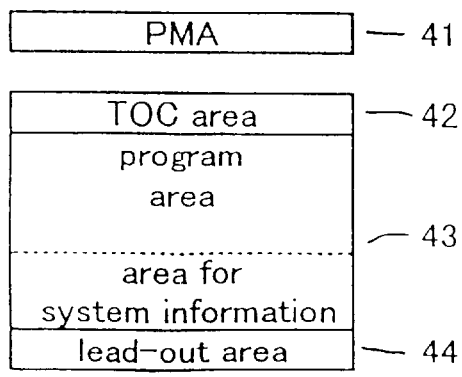
FIG. 5

OPTICAL RECORDING MEDIUM AND METHOD OF INFORMATION RECORDING/ READING AN OPTICAL RECORDING MEDIUM

BACKGROUND OF THE INVENTION

1. Field of the Invention

The present invention relates to an optical recording medium capable of retaining the secrecy of stored information and to a method of erasing, recording, and reading the stored information while retaining a high level of secrecy.

2. Discussion of the Background

Optical recording media are disc-shaped media capable of being read and recorded to by optical devices. For example, Compact Discs (hereinafter referred to as CDs) such as a Compact Disc Digital Audio (CD-DA), a Compact Disc Read Only Memory (CD-ROM), a Compact Disc Recordable (CD-R), and a Compact Disc ReWritable (CD-RW), or large capacity optical recording media such as a Digital Video Disc Read Only Memory (DVD-ROM), a Digital Video Disc Recordable (DVD-R), and a Digital Video Disc ReWritable (DVD-RW) are well known. These media have become wide spread as information recording and transmitting media. In particular, CD-RW media have become remarkably wide spread as erasable/rewrite-able CD media.

When these optical media are used as information-transmitting media, it is often important to keep information stored within the media secret. For example, data stored in a CD can be easily read by a commercially available CD drive or CD player. Therefore, a problem which occurs is that secret information is easily leaked when an optical recording medium used to store the secret information is read by an unauthorized person.

The CD-RW media can be reused by erasing information which has been stored. Information erasing methods for CD-RW include a full-erase method in which all the recorded data is erased and a quick-erase method in which only control data is erased. Control data is necessary to allow a CD drive to access the information stored in the data area of a CD-RW. The quick-erase method is used in order to quickly make a CD medium ready for rewriting.

FIGS. 4A and 4B are schematic diagrams illustrating area-structures of a CD-RW medium before and after information is erased by a quick-erase method, respectively. A prior art erase method is described hereinafter referring to FIGS. 4A and 4B.

In FIG. 4A, reference numerals 41, 42, 43, and 44 designate a program memory area 41 (hereinafter referred to as a PMA), a table of contents area 42 (hereinafter referred to as a TOC area), a program area 43, and a lead-out area 44, respectively.

User information is stored in the program area 43 of the CD-RW medium shown in FIG. 4A and a CD-RW drive gains access to the information in the program area 43 on the basis of control data recorded in the PMA 41. After the control data is additionally recorded in the TOC area 42 and the lead-out area 44, the information recorded in the CD-RW medium becomes capable of being read by a CD drive such as a CD-ROM drive. This recording operation is performed using a CD-RW drive.

When the described quick-erase method is used, all of the control data stored in the filing information areas, i.e., the PMA 41, the TOC area 42, and the lead-out area 44, are erased. The user information recorded in the program area 43 remain intact. However, there are no CD drives available which can read the user information stored in the program area 43, because there is no control data in the filing information areas.

Accordingly, there are currently no methods to read user information stored in the program area 43 of a CD-RW medium when the medium is accidentally erased by a quick-erase method.

SUMMARY OF THE INVENTION

The present invention has been made in view of the above-discussed problems and an object of the present invention is to address and solve these and other problems.

The present invention provides an optical recording medium which includes an information area. The information are is comprised of a data area, in which user information can be stored, and a filing information area, in which control data for access to the user information can be stored. Initially, the data area is in a recorded state and the filing information area is in an unrecorded state.

The optical recording medium may further include a password that is recorded in a portion of the information area.

The optical recording medium may be a CD-R or a CD-RW which includes an information area comprising a data area and a filing information area. The data area includes a program area in which user information is stored and a user area in which information can be stored. The filing information area contains control data used in accessing the stored user information. The filing information area includes a PMA, a TOC area, and a lead-out area. The user area, the TOC area, and the lead-out area are in an unrecorded state. Both the program area and a portion of the PMA are in a recorded state. The optical recording medium may further include a password that is recorded in a portion of the information area. When the medium is used as an information recording/reading system having system information that is peculiar to the system, the system information may be recorded in the medium. In this case, the system information is used as a password, and the verification of the password may be done by the information recording/reading system automatically. Specifically, when the system information is recorded in the data area, then control data for access to the system information may be further recorded in the PMA.

In another aspect of the present invention, an erase method for erasing CD-RW media is provided, which includes the steps of reading control data stored in a filing information area of a CD-RW medium, recording the control data in another medium, and erasing only the control data in the filing information area of the CD-RW medium.

In still another aspect of the present invention, an information recording/reading system is provided which includes an optical recording medium which includes a file information area. The file information area includes a PMA which is in an non-recorded state and a program area in which user information is stored; a control data storing medium which stores control data for access to the user information stored in the program area; and a recording device which records the control data in the PMA. The optical recording medium may be a CD-R medium or a CD-RW medium.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a schematic view illustrating yet another embodiment of the optical recording medium of the present invention which has a high level of secrecy;

FIGS. 4A and 4B are schematic diagrams respectively illustrating structures of a CD-RW medium before and after information is erased by a quick-erase method;

FIG. 5 is a schematic diagram illustrating a structure of an embodiment of the optical recording medium of the information recording/reading system of the present invention.

DESCRIPTION OF THE PREFERRED EMBODIMENT

Figure 1:
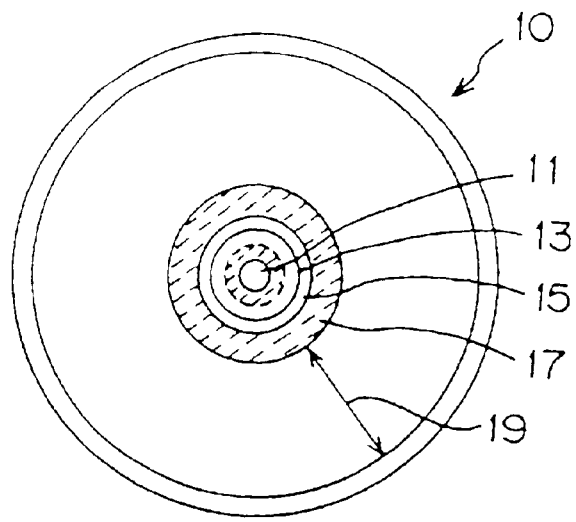
FIG. 1 is a schematic view illustrating an embodiment of the optical recording medium of the present invention.

Referring now to the drawings, wherein like reference numerals designate identical or corresponding parts throughout the several views, and more particularly referring to FIG. 1 thereof, there is shown an embodiment of the optical recording medium 10 of the present invention. The optical recording medium 10 may be, for example, a CD-R medium. Alternatively, the optical recording medium 10 may be a CD-RW medium. At the center of the optical recording medium 10, a hole 11 is provided which is capable of receiving the pivot of a CD drive. The optical recording medium includes an information area comprising a PMA 13, a TOC area 15, a program area 17, and an area 19 which includes a recordable user area and a lead-out area disposed one by one from the inside to the outside of the optical recording medium. The PMA 13 is further comprised of a recorded area 52 in which PMA data are recorded and an unrecorded area 50. The TOC area 15 and the area 19 are also in an unrecorded state. Prescribed user information or requested user information is stored in the program area 17.

The optical recording medium 10 shown in FIG. 1 includes the PMA 13, the program area 17 in an recorded state, and the TOC area 15 and the area 19 that are in an unrecorded state and in a record-able state. In addition, the portion 52 of PMA 13, which relates to the program area 17, is in a recorded state. The PMA 13, the TOC area 15, and the lead-out area are referred to as a file information area. The program area 17 and the user area are referred to as a data area.

Control data and user information can be recorded in the PMA 13 and the program area, respectively, using a CD writing drive, such as, for example, a commercially available CD-R or CD-RW drive. Alternatively, the medium 10 may be a hybrid-type medium that includes a record-able area and a ROM (read only memory) area in which pits corresponding to user information are previously formed using a stamper. In addition, the medium 10 may further include an additional area such as a PCA (power calibration area).

Even in the undesirable case in which an unauthorized user intends to read user information stored in the program area, the outsider cannot read or play the optical recording medium of the present invention by a CD player or a CD-ROM drive. This is because CD players or CD-ROM drives cannot read information stored in a CD medium if control data is not recorded in the TOC area 15. Therefore, the secrecy of the user information stored in the program area of the optical recording medium 10 can be maintained against an unauthorized user who does not have a CD writing drive.

An authorized user can read the user information by finalizing the optical recording medium using a commercially available CD writing drive. The CD writing drive reads the PMA data recorded in the PMA 13 and then records TOC data in the TOC area 15 in accordance with the PMA data. At the same time, the CD writing drive records lead-out data in the lead-out area. The medium 10 can now be read by commercially available CD drives. After this finalization of the medium 10, a selected person can read information stored in the medium using a CD writing drive and a CD player or a CD-ROM drive.

An information transmitting method using such an optical recording medium 10 is useful for a circle consisting of limited members in which limited user information is distributed to the members. The individual member possesses a CD writing drive to read the user information. Information providers such as a bank, a stockbrokerage company, or a research company records user information for the limited members in the program area 17 of the optical recording medium 10 as shown in FIG. 1, and distributes the recorded medium 10 to each member. Because the medium 10 as distributed cannot be read with a commercially available CD player or a CD-ROM drive, secrecy of the distributed information is secure even when the medium 10 passes into a person other than the members, for example, by miscarriage or robbery.

In this case, the information stored in the medium 10 can be read if an outsider has a CD writing drive. The present invention provides another optical recording medium detailed below in which information stored therein cannot be read even in such a case.

Figure 2:
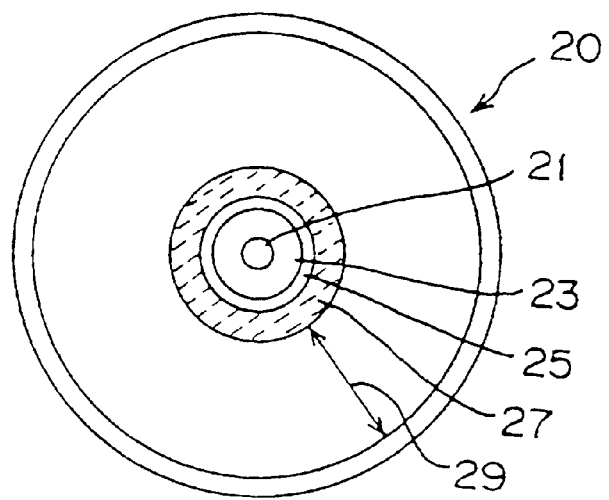
FIG. 2 is a schematic view illustrating another embodiment of the optical recording medium of the present invention.

FIG. 2 shows another embodiment of the optical recording medium 20 of the present invention. At the center of an optical recording medium 20, a hole 21 in which a pivot of a CD drive can fit is provided. The optical recording medium includes an information area having a PMA 23, a TOC area 25, a program area 27, and an area 29 comprising a recordable user area and a lead-out area. The medium 20 may further include an additional area such as a PCA (power calibration area). The PMA 23 is disposed in an innermost portion of the medium 20, and the PMA 23, the TOC area 25, the program area 27, and the area 29 are disposed one by one in an outward direction.

The TOC area 25, the area 29, and the PMA 23 are in unrecorded state and in a recordable state. Prescribed user information or requested user information is already recorded in the program area 27. In addition, a password may be recorded in a predetermined portion of the optical recording medium 20. The predetermined portion may be in the information area or a portion inside the information area such as, for example, a portion outside the lead-out area, the innermost portion of the TOC area, or the innermost portion of the PCA, etc.

Specifically, the optical recording medium 20 shown in FIG. 2 includes the PMA 23, the TOC area 25, the program area 27 that is in a recorded state, and the area 29 having the user area and the lead-out area, wherein the PMA 23, the TOC area 25, and the area 29 are in an unrecorded state and in a record-able state. The password may be recorded in a specific portion of the medium 20.

Before the medium 20 is distributed to members of the group consisting of limited members mentioned above, the information provider notifies each member of a password that is the same for all the members, and by which the information stored in the medium 20 can be read. The provider also notifies the member of PMA (control) data corresponding to the user information recorded in the program area 27.

The group member sets the distributed medium 20 in a CD writing drive and inputs the notified password. The CD writing drive compares the inputted password with the password stored in the specific portion of the medium 20. When the inputted password is verified, the drive becomes able to write to medium 20.

Next, the member records the correct PMA data in the PMA 23 using the CD writing drive. The member finalizes the medium 20 by recording TOC data in the TOC area 25 corresponding to the recorded PMA data. Alternatively, the member may finalize the medium using a computer installed with software for directly recording the TOC data in the TOC area. In this case, the member inputs the notified PMA data to the computer. By this procedure, the finalized optical recording medium 20 becomes readable or playable by CD drives.

In addition, when the information provider distributes specific information to a specific group member, other than common user information available for every member, another optical recording medium 30 of the present invention as shown in FIG. 3 may be used. An area 29A of the optical recording medium 30 is a portion in the program area in which specified information is additionally recorded by the provider using a CD writing drive. PMA data regarding the additionally recorded portion of the program area is distributed to the specified member. The member then inputs the password and the specific PMA data to finalize the medium 30. Thus the medium 30 becomes readable or playable by CD drives.

Even if the medium 30 is handed to an unauthorized user, the unauthorized user cannot read the user information, because the outsider is not notified of the password nor the PMA data regarding the additionally recorded portion. Therefore, the secrecy of the information contained within medium 30 is maintained at a high level.

In addition, when a specific password is provided for a specified member other than the common members, the specific password may be used to cover a variety of access ranks among the members. In this case, information relating to the additionally recorded portion of PMA can be read using the specific password. Accordingly, the specific information is not disclosed to members having a lower access rank, thus increasing the level of secrecy by limiting information access within the group itself.

FIGS. 4A and 4B are schematic diagrams respectively showing structures of a CD-RW medium before and after information is erased by a quick-erase method of the present invention. With reference to FIGS. 4A and 4B, one embodiment of the erase method according to the present invention is described hereinafter.

In FIG. 4A, reference numerals 41, 42, 43, and 44 designate a PMA area, a TOC area, a program area (data area), and a lead-out area, respectively.

The erase method includes a reading step, a recording step, and an erasing step. In the reading step, a drive reads control data stored in the filing information area. In the recording step, another drive records the control data in another medium. Alternatively, a drive equipped with a memory, for example a DRAM, may record the control data in another medium after reading the control data of the optical recording medium 30. In the erasing step, the drive erases the filing information area that stores the control data. Even if the control data of the CD-RW medium 30 is accidentally erased by this erase method, the information stored in the program area 43 can be read by re-recording the control data which is recorded in another medium in the filing information area of the CD-RW medium.

In another embodiment of the present invention, a higher level of secrecy is possible if the control data of a CD-RW medium in which the control data has been erased by the above-described method is stored in another medium which is kept physically separate from the CD-RW medium.

Figure 6:
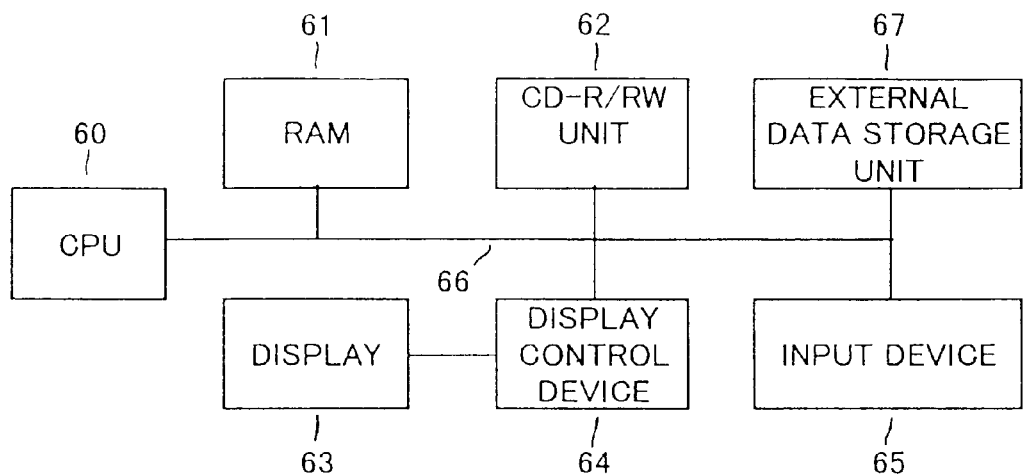
FIG. 6 is a block diagram illustrating another embodiment of the information recording/reading of the present invention.

FIG. 6 is a block diagram showing one embodiment of the information recording/reading system constructed according to the present invention. An input device 65 such as a keyboard or a mouse is disposed so that an operator can control read, record, and initialization functions to a CD-RW medium. In addition, information needed for the controlling system is transferred to the system by the input device 65. A CD-R/RW unit 62 includes a CD-R/RW drive and an optical recording medium selected from the group consisting of CD-R medium and CD-RW medium. An external data storage unit 67 includes another drive capable of read and write operations and another medium that stores control data for access to the user information stored in a program area of the optical recording medium.

A system comprising a CPU (Central Processing Unit) 60 controls the input device 65 through a bus 66, a display control device 64, a RAM (random access memory) device 61, and the CD-R/RW unit 62. A command to begin a prescribed operation is inputted by the input device 65 to the system. The system then transfers a program to the RAM 61 from the external data storage unit 67. Programs for operating the erase method of the present invention, or other programs for recording and reading information are housed in the external data storage unit 67. The RAM 61 temporarily stores such programs or various kinds of information, which are required for recording and reading information of the CD-RW medium, when the system operates.

The display control device 64 controls a display 63 such as a CRT (cathode-ray tube) display or LCD (liquid crystal display) such that the program stored in the RAM 61 and window images and icons related to various functions of the program are displayed on the display 63. The external data storage unit 67 also stores data for recording or data required for operations of the system, in addition to the program for operating the erase method of the present invention and the program for recording and reading information to and from the optical recording medium.

The CD-R/RW unit 62 includes another CPU and another RAM to record, read and erase information in the CD-RW medium in accordance with a command from the CPU 60.

Figure 7:
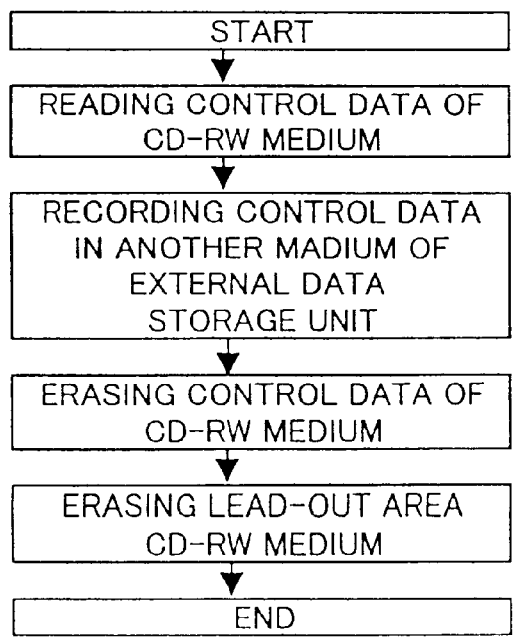
FIG.7 is a flow chart illustrating an embodiment of the erase method of the present invention.

FIG. 7 is a flow chart illustrating one embodiment of the erase method according to the present invention. The erase method is further explained hereafter with reference to FIG. 7.

When a CD-RW medium is set on the CD-R/RW drive in the CD-R/RW unit 62, as shown in FIG. 6, the CD-R/RW drive reads control data stored in a filing information area (a PMA and a TOC area) of the medium, and records the control data in another medium in the external data storage unit 67. Subsequently, the control data stored in the PMA and the TOC area of the CD-RW medium is erased and the lead-out area of the CD-RW medium is erased. Using this procedure, the control data in the filing information area of the CD-RW medium is erased, resulting in completion of the erasure.

The CD-RW medium, which has been erased, is identified as an unrecorded medium by an information recording/reading system. Therefore, new data can be recorded on the medium.

Alternatively, the information stored in the data area can be read by re-recording the control data stored in the external data storage unit 67 to the filing information area of the CD-RW medium. This operation can be performed only by a person who can access the control data.

The program area may be recorded using a writing drive that is capable of recording on an optical recording medium. Alternatively, the medium may be a hybrid-type medium that includes a recordable area and a ROM (read only memory) area in which pits are previously formed using a stamper.

In addition, when the control data is required to be re-recorded to the PMA area of the erased CD-RW medium the following method can also be used. As shown in FIG. 5, system information that is peculiar to the system is recorded in the data area (program area). Then the control data need to access the system information and the user information stored in the program area is recorded to the PMA 41. Control data is then recorded in the TOC area and the lead-out area of the CD-RW medium so that CD drives can read the information stored in the CD-RW medium. If access is allowed only when the additionally recorded system information is verified of the current system information of the system being used, the secrecy of the information stored in the CD-RW is improved.

Further, when an application program and an installation program are recorded in the program area 43, the secrecy can be improved using a method in which the application program can be installed only when additionally recorded system information is verified to be the same as the system information of the system being currently used.

As described above in detail, the present invention provides a novel optical recording medium, erase method, and information recording/reading system.

The optical recording medium of the present invention has a high level of secrecy for user information stored therein.

What is claimed is:

1. An optical recording medium, said optical recording medium comprising:

an information area, said information area comprising:

a data area, said data area including a program area in a recorded state containing user information and a user area in an unrecorded state in which user information is stored; and a filing information area in which control data for access to the user information is to be stored, said filing information area comprising a PMA area in a recorded state, a TOC area in an unrecorded state, and a lead-out area in an unrecorded state.

2. An optical recording medium, said optical recording medium comprising:

an information area, said information area comprising:

a data area, said data area including a program area in a recorded state containing user information and a user area in an unrecorded state in which user information is stored; and a filing information area in which control data for access to the user information is to be stored, said filing information area comprising a PMA area in an unrecorded state, a TOC area, and a lead-out area.

3. An optical recording medium according to claim 2, wherein said information area further comprises a recorded portion containing a password.

* * * * *